United States Patent [19]

Durkee et al.

[11] Patent Number: 4,516,140

[45] Date of Patent: May 7, 1985

[54] PRINT HEAD ACTUATOR FOR AN INK JET PRINTER

[75] Inventors: David B. Durkee, Arlington Heights; James P. Koller, Vernon Hills; Robert M. Wentzel, Mundelein, all of Ill.

[73] Assignee: AT&T Teletype Corporation, Skokie, Ill.

[21] Appl. No.: 565,570

[22] Filed: Dec. 27, 1983

[51] Int. Cl.[3] .......... G01D 15/18

[52] U.S. Cl. .......... 346/140 R; 310/328; 310/330

[58] Field of Search .......... 346/140; 310/328, 330, 310/331

[56] References Cited

U.S. PATENT DOCUMENTS 3,747,120 7/1973 Stemme .......... 346/140 X
3,857,049 12/1974 Zoltan .......... 346/140 X
3,946,398 3/1976 Kyser .......... 346/140 X

FOREIGN PATENT DOCUMENTS 2256667 6/1974 Fed. Rep. of Germany .

*Primary Examiner*—Joseph W. Hartary
*Attorney, Agent, or Firm*—W. K. Serp

[57] ABSTRACT

The illustrated ink jet (19) includes a chamber (22) containing a quantity of ink (54) discharged through a nozzle orifice (28) in the form of droplets (84). The ink is discharged in response to movement of an actuator positioned over a chamber (22) opening. The actuator (50) includes a piezoceramic plate (60), the surfaces of which are covered by electrodes (62, 64). Soldered to the electrode (62) is a bending plate (56) which is secured by adhesive (58) to a flexible sheet of insulating material (52). Control signals are fed through conductors (72, 59) to the electrodes (62, 64).

15 Claims, 5 Drawing Figures

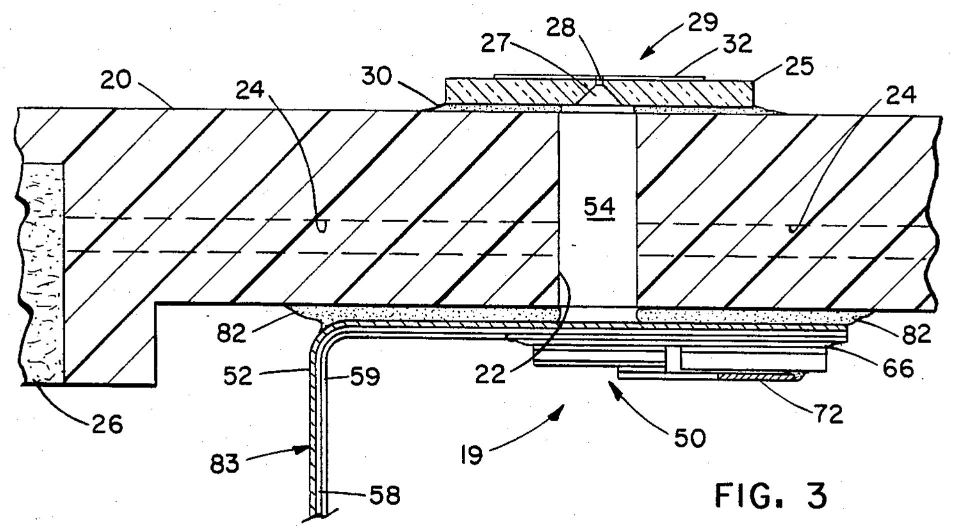
FIG. 3
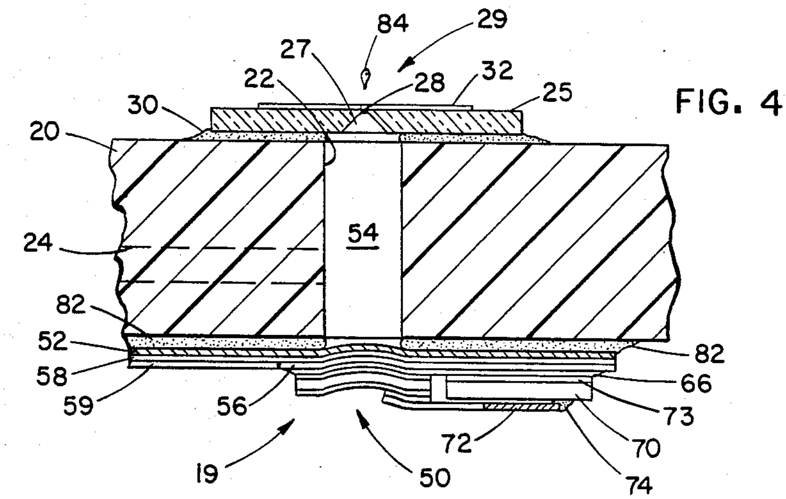
FIG. 4
FIG. 5
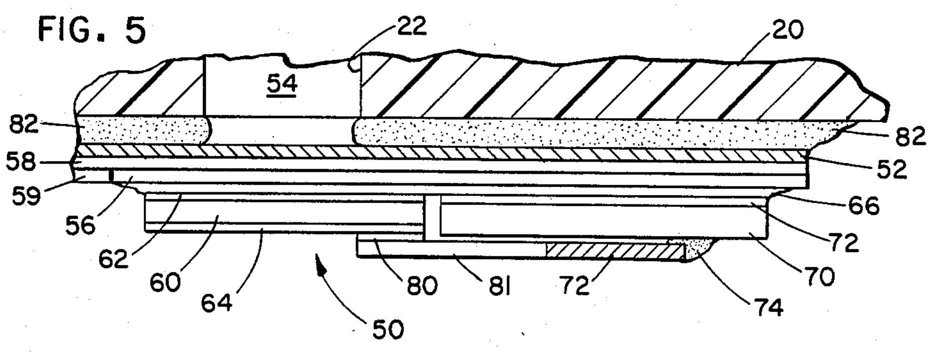

PRINT HEAD ACTUATOR FOR AN INK JET PRINTER

DESCRIPTION

1. Technical Field

This invention relates to an actuator for the print head of an ink jet printer.

2. Background of the Invention

During the operation of an ink jet printer, droplets of ink are forced from a storage chamber through a nozzle orifice and deposited on a recording medium. One wall of the chamber has an opening which is covered with an actuator. The actuator may be an electro-mechanical transducer which produces short duration pressure increases in the ink within the chamber forcing droplets of ink through the nozzle orifice. One such actuator is described in U.S. Pat. No. 3,747,120 entitled "Arrangement Of Writing Mechanisms For Writing On Paper With A Colored Liquid", by N. Stemme and issued July 17, 1973. As shown in this patent, a metal plate is bonded to a piezoelectric crystal plate. The metal plate is positioned to seal one wall of a chamber containing a small quantity of ink. An electrical field is applied across the thickness of the piezoelectric crystal plate which causes it to radially contract and the composite structure to bend. A large number of such actuators and corresponding chambers are placed in an array to form a print head. The construction of such a print head is particularly difficult since, in accordance with prior teaching, each metal plate and piezoelectric crystal combination must be carefully positioned with respect to its cooperating chamber opening. Conductors are subsequently attached. The ink used is somewhat corrosive and often electrically conductive. The metal plate may corrode when positioned adjacent to the ink contained in the chamber. Further, there is a possibility that ink may leak from the chamber shorting the conductors.

As described in the aforementioned reference, the bending force of the metal plate is transmitted directly to the ink. The transfer efficiency of energy between the two media is often low due to the large difference in the acoustic impedance of the two media. To overcome such losses, relatively high energy levels must be supplied. It is an object of this invention to provide an actuator for an ink jet printer which is efficient, readily fabricated and is highly resistive to the corrosive action of ink.

DISCLOSURE OF THE INVENTION

This invention concerns an actuator for the print head of an ink jet printer in which droplets of ink are discharged through a nozzle orifice in a wall of a confined chamber containing a small quantity of ink. The chamber has an opening covered by an actuator which includes a piezoelectric crystal plate. First and second conductive electrodes cover portions of the surface of the piezoelectric plate. A thin flexible sheet of insulating material has bonded to a first surface thereof a metallic bending plate. The bending plate is also bonded to the surface of the first conductive electrode. The bending plate resists deformation of the piezoelectric crystal plate in response to an electrical potential difference applied to the conductive electrodes. The sheet of insulating material is positioned with the second surface thereof disposed toward the interior of the chamber. Securing means holds the second surface of the insulating material to the outer wall of the chamber around the periphery of the opening. In response to an electrical potential difference applied to the first and second electrodes, the volume of the chamber is decreased; and droplets of ink are discharged through the nozzle orifice.

THE DRAWING

FIG. 3 is a sectional view taken along the line 3—3 of FIG. 2 illustrating a first operating condition of a component of the print head assembly of FIG. 1;

FIG. 4 is a sectional view similar to that of FIG. 3 illustrating a second operating condition of a component of the print head assembly of FIG. 1; and FIG. 5 is an enlarged sectional view of certain of the components of the print head assembly of FIG. 3.

DETAILED DESCRIPTION

Figure 1:
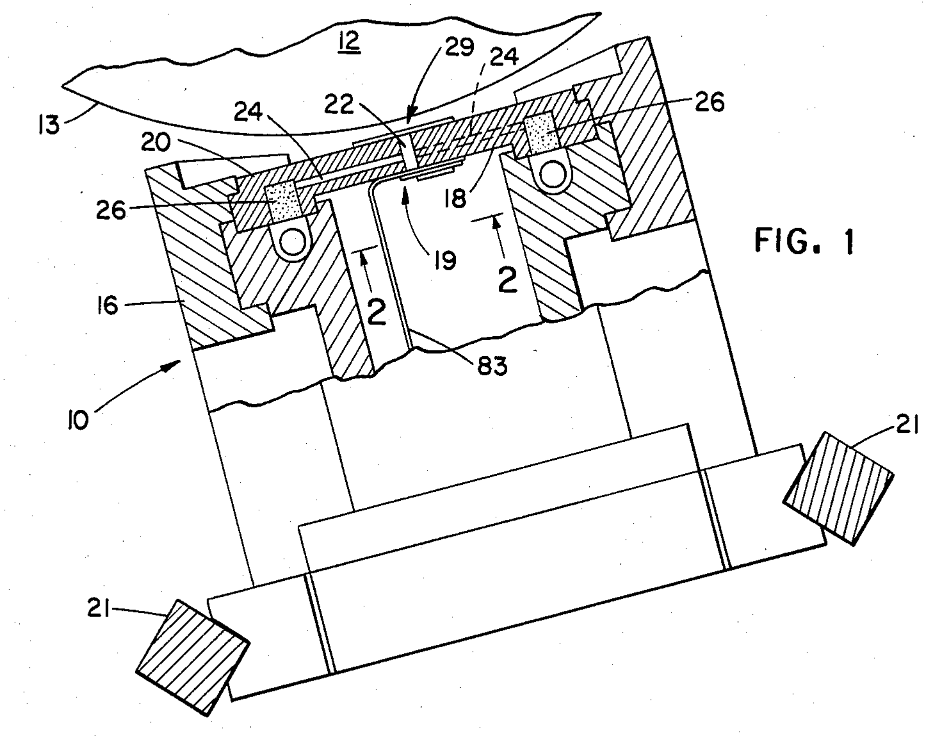
FIG. 1 is a partial sectional view of a portion of an ink jet printer including a print head assembly embodying certain features of this invention.

An ink jet printer 10, illustrated in FIG. 1, includes a drum 12 supporting and transporting a recording medium 13. The printer 10 also includes a frame 16 carrying a print head assembly 18 including a plurality of ink jets 19. The frame 16 is supported by a pair of guide rails 21 for movement along a predetermined path. For a more complete description of the illustrated frame 16 and drum 12, the reader is directed to copending U.S. patent application Ser. No. 497,386 filed May 23, 1983 entitled "Ink Jet Printer" by D. B. Durkee et. al. and having a common assignee with this application. The print head assembly 18 includes a cavity block 20 having a plurality of open ended cylindrical chambers 22 in communication through passage 24 with ink supply reservoirs 26. The chambers 22 are arranged in a linear array with the axis of each chamber 22 normal to the surfaces of the cavity block 20.

One of the ink jets 19 is illustrated in FIGS. 3, 4 and 5. As shown, the end of the chamber 22, disposed toward the drum 12, is covered with a nozzle 29 including a nozzle plate 25 having a tapered passage 27 terminating in a nozzle orifice 28. The nozzle plate 25 is secured to the cavity block by an adhesive 30. A polysulfide rubber compound has been found to be a suitable adhesive. The exposed surface of the nozzle plate 25 is covered with a layer of anti-wetting film 32 which prevents the ink droplets from wetting the surface of the nozzle plate 25 thus assuring movement of the droplets toward the print medium 13 after passing through the nozzle orifice 28.

The opposite end of the chamber 22 is covered with an actuator 50 which has a layered construction. The first layer of the actuator 50 is a single, thin sheet of insulating material 52. A suitable insulating material is a polyimide material sold under the trademark KAPTON by E. I. DuPont DeNemours and Company. Other suitable materials include a wide range of polymers such as polysulfone, polyethylene, polypropylene, polyester, and polytetrafluoroethylene. KAPTON is particularly suitable due to its ability to efficiently transmit movement to the ink 54 without generating excessive reflected waves. The acoustic impedance characteristics of KAPTON are quite similar to the acoustic impedance characteristics of liquid ink thus providing efficient energy transfer between the two media. A bending plate 56 is bonded with an adhesive layer 58 to the surface of the sheet of insulating material 52 and is positioned over the opening in the chamber 22. One material among many which are suitable for the bending plate 56 is nickel. Nickel provides desired stiffness, conductivity, and solderability. Connected to the bending plate 56, continuing over the surface of the insulated sheet 52 and secured thereto by the adhesive layer 58, is a ribbon conductor 59 which is also connected to a printer control circuit (not shown). The bending plate 56 and ribbon conductor 59 may be integral, that is, both may be formed of the same material.

The actuator 50 additionally includes a piezoelectric crystal plate 60 which, in the illustrated embodiment, is piezoceramic. The surfaces of the piezoelectric plate 60 are coated with a thin metallic film providing two opposing electrodes 62, 64. Electroless nickel has been found to be a satisfactory material for the electrodes. The first electrode 62 is secured with solder 66 to the bending plate 56. Conductive epoxy has also been found suitable.

Figure 2:
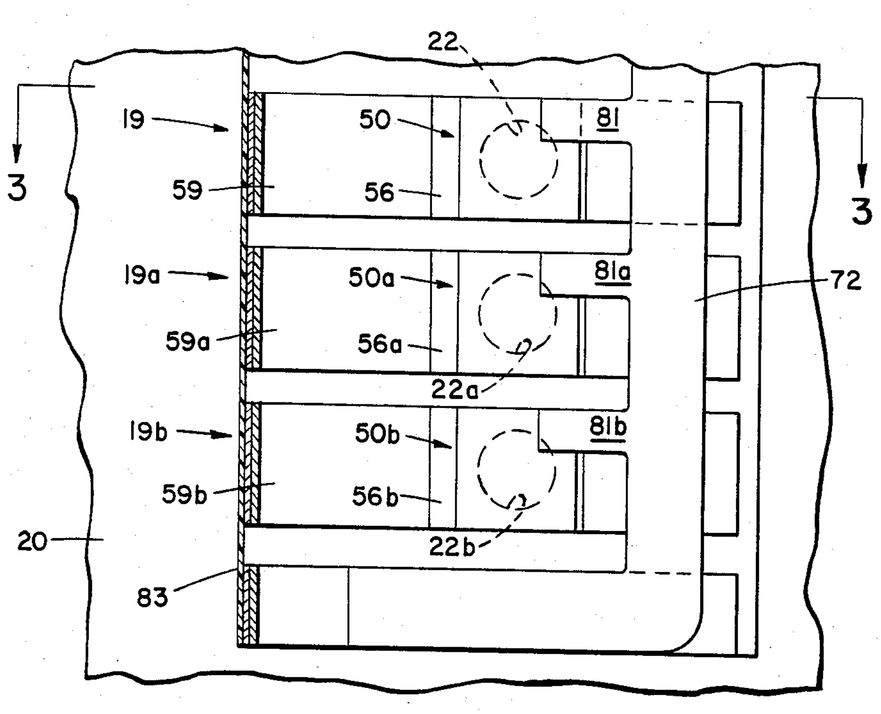
FIG. 2 is a plan view of the portion of the print head assembly taken along the line 2—2 of FIG. 1.

The print head assembly 18 also includes a second conductor 72 having a plurality of fingers 81, 81*a*, and 81*b*. One of the fingers 81 is bonded by solder 80 to the second electrode 64 of the actuator 50. The conductor 72 is positioned to allow connection of each actuator 50, 50*a*, and 50*b* to its respective fingers 81, 81*a*, and 81*b* as shown in FIG. 2. The opposite end of the conductor 72 is connected to the previously mentioned control unit (not shown). An insulating spacer 70 is positioned to prevent shorting of the conductor 72 with the solder layer 66. The spacer is bonded to the solder layer 66 by a layer of adhesive 73. The end of the conductor 72 is attached to the spacer 70 by an adhesive fillet 74, and the combination forms a flat cable 83 which may be conveniently routed within the printer 10.

The cable 83 and the actuators 50, 50*a*, and 50*b* are preferably fabricated as a complete unit. Thereafter, the actuators 50, 50*a*, and 50*b* are aligned to their respective chambers 22, 22*a*, and 22*b*. The exposed surface of the flexible insulating sheet 52 is bonded to the surface of the cavity block 20 by adhesive 82. In practice, the surface of the cavity block 20 is covered with a thin layer of adhesive and the insulating sheet 52 subsequently positioned. This procedure assures that the actuators 50, 50*a*, and 50*b* are accurately positioned and that the bending and piezoceramic plates associated with each of the actuators are protected from the corrosive action of the ink 54.

The rest position of the actuator 50 is shown in FIG. 3. The surface tension of the ink 54, at the nozzle orifice 28, is sufficient to keep the ink 54 within the chamber 22. In response to the application of an electrical potential across the electrodes 62, 64, an electric field is produced in the piezoceramic plate 60 causing a slight increase in its thickness and a reduction in the surface area of the plate 60. The bending plate 56, bonded to the piezoceramic plate 60, resists dimensional changes in the surface area of the piezoceramic plate 60. Thus, when the piezoceramic plate contracts, the actuator 50 bulges into the chamber 22 (FIG. 4). The pressure and volumetric displacement generated by the actuator 50, in the chamber 22, forces ink droplets 84 out of the nozzle orifice 28 toward the recording medium 13.

While this invention has been particularly shown and described in connection with an illustrated embodiment, it will be understood that various changes in form and detail will be made without departing from the spirit and scope of the invention as set forth in the following claims:

We claim:

1. An actuator (50) for the print head of an ink jet printer (10) in which droplets of ink (84) are discharged through a nozzle orifice (28) in a wall of a chamber (22) for containing a small quantity of ink (54), the actuator (50) comprising:

a piezoelectric crystal plate (60) having first and second opposing surfaces, said piezoelectric plate (60) experiencing a dimensional change when placed in an electrical field;

first and second electrodes (62, 64) covering portions of said first and second opposing surfaces of said piezoelectric crystal plate (60);

a bending plate (56) with a first surface bonded to the surface of said first conductive electrode (62);

a thin flexible sheet of insulating material (52) having first and second surfaces;

a first surface of said sheet of insulating material (52) bonded to a second surface of said bending plate (56), said bending plate (56) resisting deformation by said piezoelectric crystal plate (60) in response to an electrical potential difference applied to said electrodes (62, 64);

said sheet of insulating material (52) being positioned so that said second surface of said sheet of insulating material (52) is disposed over an opening in the wall of said chamber (22); and means (82) for securing said second surface of said sheet of insulating material (52) to the wall of said chamber (22) around the periphery of said opening whereby the actuator (50) decreases the volume of the chamber (22) in response to an electrical potential difference applied across said first and second electrodes (62, 64) causing the discharge of droplets of ink (84) through said nozzle orifice (28).

2. The actuator (50) of claim 1 wherein said securing means (82) is a flexible adhesive.

3. The actuator (50) of claim 1 wherein said bending plate is metallic and which further includes a first conductor (59) bonded to said first surface of said insulating sheet (52) and connected to said metallic bending plate (56).

4. The actuator (50) of claim 2 wherein said piezoelectrical crystal (60) is piezoceramic.

5. The actuator (50) of claim 2 wherein said metallic bending plate (56) is bonded to said first electrode with solder (66).

6. The actuator (50) of claim 2 wherein said insulating sheet (52) is a polyimide material.

7. The actuator (50) of claim 5 wherein said metallic bending plate (56) is nickel.

8. The actuator (50) of claim 2 wherein said flexible adhesive (82) is a polysulfide rubber.

9. An actuator (50) for the print head of an ink jet printer (10) in which droplets (84) of ink are discharged through a plurality of nozzles (29), each nozzle (29) covers an opening in the wall of one of a plurality of chambers (22) in a cavity block (20), each of said chambers (22) has an opening with the opening being arranged in an array on a surface of said cavity block (20), said actuator (50) comprising:

a thin flexible sheet of insulating material (52) having first and second surfaces;

a plurality of piezoelectric crystal plates (60) having first and second electrodes (62, 64) bonded to the surfaces of each of said plates (60);

a plurality of bending plates (56), each bending plate (56) being bonded to a corresponding first electrode (62) of one of said piezoceramic plates (60), said bending plates (56) being bonded to said first surface of said sheet of insulating material (52) and arranged into an array, the shape of which corresponds to the configuration of said chamber (22) openings; and a flexible adhesive (82) applied to the surface of said cavity block (20) around the periphery of each of said openings, said sheet of insulating material (52) being positioned on a surface of said cavity block (20) so that the second surface of said sheet of insulating material (52) is secured to the surface of said cavity block (20) by said adhesive (82).

10. The actuator (50) of claim 9 wherein said bending plate is metallic and which further includes a plurality of first conductors (59) bonded to said first surface of said sheet of insulating material (52), each of said first conductors (59) is connected to one of said metallic bending plates (56) thereby providing a separate conductive path to each of said first electrodes (62).

11. The actuator (50) of claim 9 which further includes a second conductor (72) positioned to provide electrical connections to each of said second electrodes (64) and means for connecting said second conductor (72) to said electrodes (64).

12. The actuator (50) of claim 11 wherein said metallic bending plates (56) are soldered to said first electrodes (62).

13. The actuator (50) of claim 11 wherein said sheet of insulating material is contructed of a polyimide material.

14. The actuator (50) of claim 11 wherein said metallic bending plates (56) are nickel.

15. The actuator (50) of claim 11 wherein said flexible adhesive (82) is polysulfide rubber.

* * * * *